United States Patent
Kobayashi et al.

(10) Patent No.: US 6,577,335 B2
(45) Date of Patent: *Jun. 10, 2003

(54) MONITORING SYSTEM AND MONITORING METHOD

(75) Inventors: Kenzo Kobayashi, Kawasaki (JP); Takafumi Edanami, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,148

(22) Filed: Mar. 10, 1998

(65) Prior Publication Data

US 2001/0040624 A1 Nov. 15, 2001

(30) Foreign Application Priority Data

Oct. 20, 1997 (JP) ............................................. 9-287479

(51) Int. Cl.$^7$ .............................. H04N 7/18; H04N 7/00
(52) U.S. Cl. ........................ 348/152; 348/154; 348/155; 348/36
(58) Field of Search ................................ 348/152, 153, 348/154, 155, 36, 42, 43; 345/425

(56) References Cited

U.S. PATENT DOCUMENTS 5,495,576 A * 2/1996 Ritchey ........................ 345/425
5,892,538 A * 4/1999 Gibas ............................ 348/43
5,940,049 A * 8/1999 Hinman et al. ................. 345/2
6,043,837 A * 3/2000 Driscoll, Jr. et al. .......... 348/36

FOREIGN PATENT DOCUMENTS

| JP | 56-169487 | 12/1981 |
| JP | 58-86658 | 5/1983 |
| JP | 60-163594 | 8/1985 |
| JP | 1-241991 | 9/1989 |
| JP | 7-244246 | 9/1995 |

* cited by examiner

Primary Examiner—Allen Wong
(74) Attorney, Agent, or Firm—Staas & Halsey LLP

(57) ABSTRACT

A first camera 12 having a fish-eye lens 13 and a second camera 14 having a fish-eye lens 15 are disposed with the respective fish-eye lenses faced with each other. An image pick-up range of the first camera 12 and an image pick-up range of the second camera 14 are partially overlapped, and only a relatively narrow area at the backside of each camera becomes a blind area. A processor 30 sets a frame F in the image pick-up area of the first camera 12 and the image pick-up area of the second camera 14 respectively corresponding to a set monitoring range. The image data within these frames F are taken out and distortions of the image due to the characteristics of the fish-eye lenses 13 and 15 are eliminated to obtain first and second transformed frame data. These transformed frame data are combined by an image combining unit 25, to obtain image data corresponding the monitoring range free from any gap. The combined image data is displayed in a monitor 8 through a PC 7.

14 Claims, 11 Drawing Sheets

FIG. 9
(PRIOR ART)
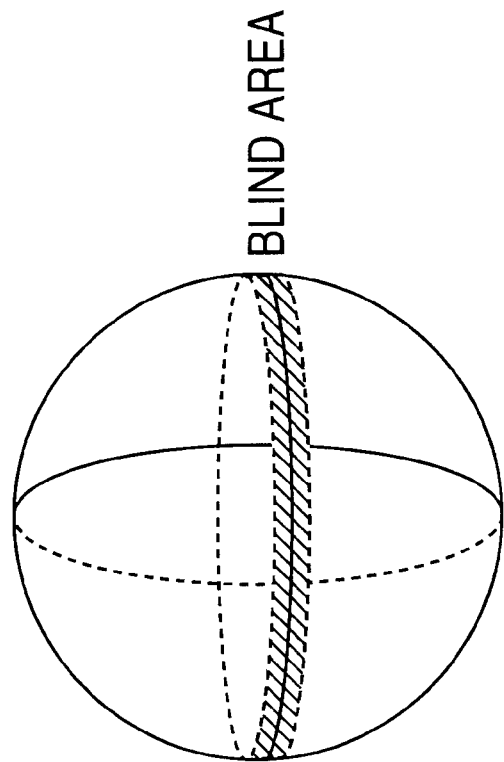
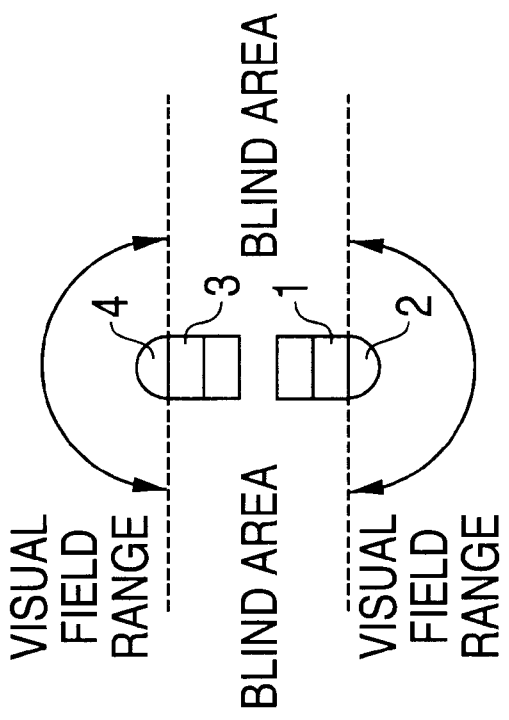

MONITORING SYSTEM AND MONITORING METHOD

BACKGROUND OF THE INVENTION

The present invention relates to a monitoring system and a monitoring method for monitoring around by using cameras each having a fish-eye lens.

A monitoring system using cameras having a fish-eye lens is disclosed in, for example, the Japanese Patent Application Laid-open No. 56-16948. According to a system disclosed in this publication, an image of a wide space is captured by a camera which includes a fish-eye lens having a visual field range of approximately 180°, and a necessary range is taken out from image data obtained by the camera. Then, the extracted image data is electronically transformed to eliminate distortions of the image due to lens characteristics and two-dimensional image data is generated, and this are displayed in a display unit.

Further, in order to cover a visual field range (monitoring range) of 360°, there is considered a method in which two monitoring cameras 1 and 3 having fish-eye lenses 2 and 4 respectively are prepared and the cameras 1 and 3 are disposed in such a state that the fish-eye lenses 2 and 4 face mutually opposite directions, as shown in FIG. 9(a).

According to the structure shown in FIG. 9(a), however, the portion between the two fish-eye lenses 2 and 4 becomes entirely a blind area although each of these lenses has a visual field range of approximately 180°. Since it is not possible to completely adhere the fish-eye lens 2 and the fish-eye lens 4 closely together because of the physical thickness of the fish-eye lenses 2 and 4, the focal length of the lenses, the physical thickness of an image pick-up device (CCD), etc., a band-shaped blind area is formed within an approximately spherical visual field range, as shown in FIG. 9(b). Accordingly, even if the cameras 1 and 3 are disposed in a vertical direction or a horizontal direction, there occurs a gap (a range of which image cannot be picked up) between an image captured by the camera 1 and an image captured by the camera 3.

FIG. 10 shows a case where the fish-eye lenses 2 and 4 shown in FIG. 9(a) are arranged so that the optical axis of each lens is set along a horizontal direction. As shown in FIG. 10, there is a range in which the cameras 1 and 3 cannot monitor around the cameras 1 and 3 because the backside of each of the fish-eye lenses 2 and 4 is a blind area. Accordingly, there is a risk that a suspicious character approaches the cameras 1 and 3 from this area that cannot be monitored without being captured, and destroy the cameras.

FIG. 11 is a diagram for showing a case where the center axis of each of the fish-eye lenses 2 and 4 shown in FIG. 9(a) is set along a vertical direction. In this case, if the fish-eye lenses 2 and 4 are installed at a height higher than the height of a person as shown in FIG. 11(a), the fish-eye lens 2 positioned at the upper side does not play a role. On the other hand, if the fish-eye lenses 2 and 4 are installed at a height near the floor as shown in FIG. 11(b), the fish-eye lens 4 positioned at the lower side does not play a role.

Accordingly, in order to effectively utilize both fish-eye lenses, it is desirable that the fish-eye lenses 2 and 4 are installed within a range of the height of an upper part of the body of a person having an average height as shown in FIG. 11(c). However, in this case, there is a risk that the image of the face of a suspicious character is not captured by any one of the cameras 1 and 3. Further, since it is not possible to capture an image of the total shape of a person in this case, it becomes difficult to specify physical characteristics of the suspicious character based on the images obtained from the cameras 1 and 3.

SUMMARY OF THE INVENTION

In order to overcome the above-described difficulties, it is an object of the present invention to provide a monitoring system and a monitoring method that avoid a gap between image pick-up ranges of two cameras by localizing and minimizing the blind area and which monitor around unlike conventional systems and methods.

A monitoring system of the present invention includes: a first camera having a fish-eye lens; a second camera having a fish-eye lens and disposed opposite to the fish-eye lens of the first camera in a direction to face each other; an image data extracting unit for extracting first and second frame data corresponding to a monitoring range from first image data captured by the first camera and second image data captured by the second camera; and an image combining unit for generating combined frame data corresponding to a monitoring range by combining first and second frame data extracted by the image data extracting unit.

According to the above-described structure, an image pick-up range of the first camera and an image pick-up range of the second camera are partially overlapped and only a relatively small area at the backside of each camera becomes the blind area. Frame data of a portion corresponding to the monitoring range are extracted from the image data obtained by the first camera and the second camera, and these frame data are combined by the image combining unit so that combined frame data corresponding to the monitoring range is generated. Even when the monitoring range extends over the image pick-up range of the first camera and the image pick-up range of the second camera, it becomes possible to obtain image data for showing the monitoring range without a gap.

The combined image of the monitoring range can be displayed in a display unit.

When the optical axis of each of the fish-eye lenses of the first and second cameras is disposed to be substantially parallel with a vertical direction, it becomes possible to catch substantially a complete image of the total shape of a person around the first and second camera. It is desirable that the optical axes of the fish-eye lenses of the first and second cameras substantially match together.

Further, the monitoring system may be additionally provided with a transformer for transforming the first and second frame data respectively, extracted by the image data extracting unit, before combining these frame data by the image combining unit. The transformer may be provided with a function for eliminating distortions of an image due to the characteristics of the fish-eye lenses of the first and second cameras.

In order to increase the efficiency of data transfer from the image combining unit to the display unit, it is desirable to provide an image compressing unit for compressing the combined frame data output from the image combining unit and for sending the compressed frame data toward the display unit.

The image combining unit extracts frame data of a non-overlapped range captured by only the first camera from the first transformed frame data, extracts frame data of a non-overlapped range captured by only the second camera from the second transformed frame data, extracts frame data of an overlapped range from at least one of the first and second transformed frame data, and combines the frame data of the two non-overlapped ranges and the frame data of the overlapped range, to thereby generate combined frame data.

Further, the image combining unit can extract frame data of the overlapped range from both the first and second transformed frame data to improve the resolution of the frame data of the overlapped range by interpolating these data. Since the overlapped range corresponds to the area of which resolution becomes low when the data is transformed, it is desirable to improve the resolution by interpolating both image data of the overlapped range. The size of the overlapped range can be easily adjusted by adjusting the distance between the fish-eye lenses.

The monitoring system of the present invention can be installed in any place either indoors or outdoors. In case of indoors, it is desirable to install the monitoring system in a relatively wide room or a passage of a building, such as, for example, each room (or floor) of a store like a department store or a supermarket, a bank, an art museum, a museum, a library, a cinema house, a lobby of a hotel, etc. In the case of outdoors, it is desirable to install the monitoring system around a station, a car parking area, a play ground, a zoological garden, a park, a house garden, etc. Although it is desirable that the monitoring system of the present invention is used for monitoring a presence or absence of a suspicious character within a specific area, the monitoring system of the present invention may also be used for monitoring an animal or a plant.

Further, a monitoring method of the present invention includes: a first step for capturing an image by a first camera having a fish-eye lens and for capturing an image by a second camera having a fish-eye lens and disposed opposite to the fish-eye lens of the first camera; a second step for extracting image data of a range corresponding to a monitoring range from first image data captured by the first camera and second image data captured by the second camera respectively; a third step for transforming the first image data and the second image data corresponding to the ranges extracted in the second step into first transformed frame data and second transformed frame data respectively; a fourth step for generating combined image data corresponding to a monitoring range by combining the first transformed frame data and the second transformed frame data obtained in the third step; and a fifth step for displaying in a display unit an image based on the combined image data generated in the fourth step.

To improve the efficiency of data transfer, it is desirable to include a sixth step for compressing combined image data generated in the fourth step and for transmitting the compressed data toward the display unit.

In the fourth step, it is possible to extract the frame data of a non-overlapped range obtained by only the first camera, the frame data of a non-overlapped range obtained by only the second camera and the frame data of an overlapped range obtained in superposition by the first camera and the second camera respectively, from the first transformed frame data and the second transformed frame data obtained in the third step, and to combine these image data to generate combined image data.

BRIEF DESCRIPTION OF THE DRAWINGS

FIGS. 9 to 11 show prior-art examples.

DETAILED DESCRIPTION OF THE PREFERRED EMBODIMENTS

Embodiments of the present invention will be explained below with reference to the drawings.

Figure 1:
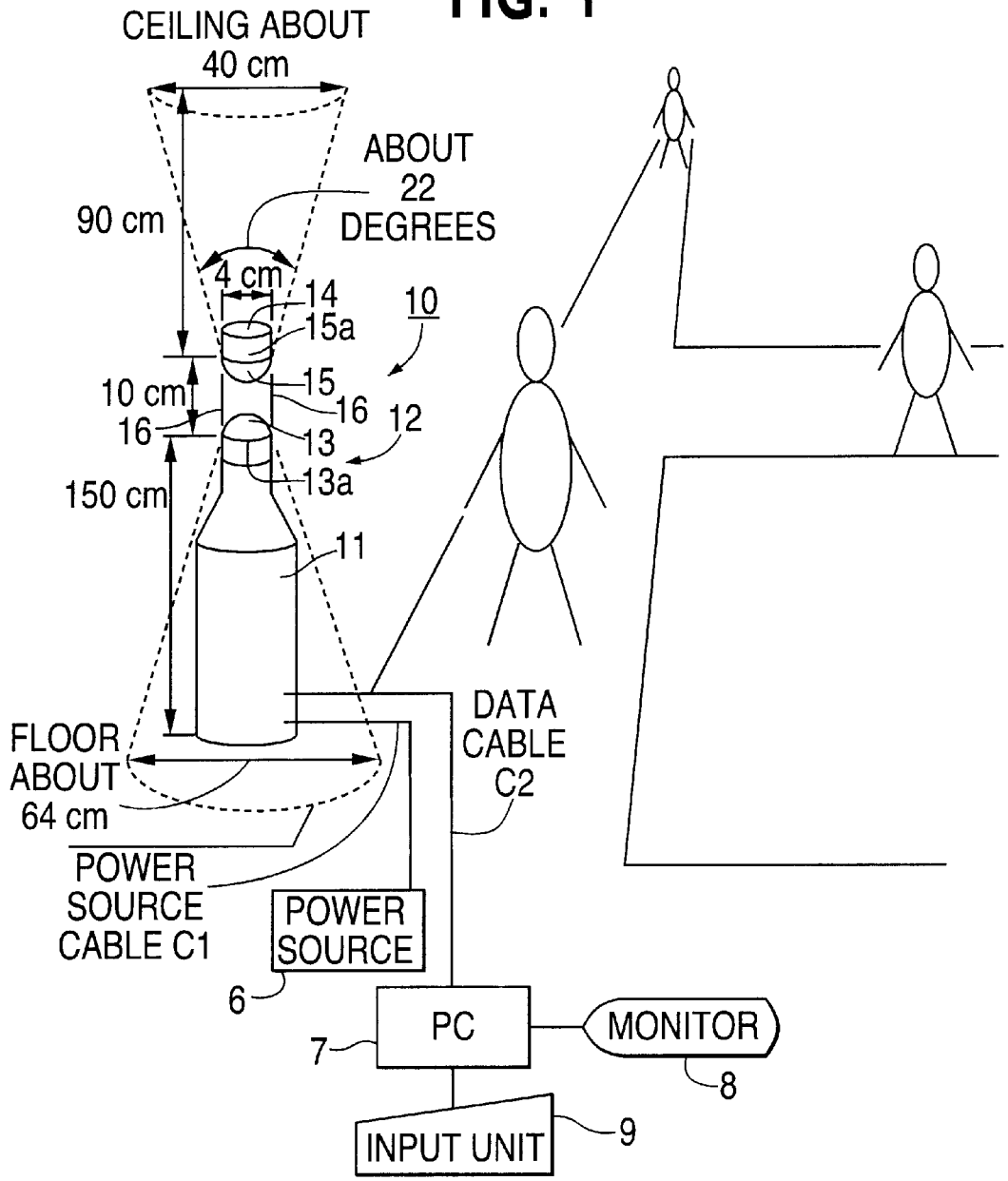
FIG. 1 is a structure diagram for showing a monitoring system according to an embodiment of the present invention.

FIG. 1 is a structure diagram for showing a monitoring system 10 using an all-angle monitoring camera according to an embodiment of the present invention. FIG. 1 shows the monitoring system 10 installed in a room of a building (for example, a floor of a department store).

Referring to FIG. 1, the monitoring system 10 has in general a cylindrical pillar unit 11 installed on the floor of a building, a first camera 12 mounted on the front end of the pillar unit 11 and a second camera 14 disposed in opposition to the first camera 12. The second camera 14 is supported above the first camera 12 by a plurality of bar-shaped members 16 installed along a vertical direction to the pillar unit 11.

The number of the bar-shaped member 16 may be one so long as it can properly support the second camera 14 above the first camera 12. Alternatively, the second camera 14 may be suspended by a supporting member from the ceiling instead of being supported by the bar-shaped member 16.

The first camera 12 is structured by a cylindrical main unit and a semi-spherical fish-eye lens 13, and is disposed with the sphere surface of the fish-eye lens 13, facing upwards. The main unit of the first camera 12 and the small diameter section at the upper end of the pillar unit 11 are formed to have the same diameters as the diameter of a side edge section 13a of the fish-eye lens 13.

The second camera 14 is structured by a cylindrical main unit and a semi-spherical fish-eye lens 15, in a manner similar to that of the first camera 12, and is supported above the first camera 12 with the fish-eye lens 15 facing downwards.

Thus, the fish-eye lens 13 of the first camera 12 and the fish-eye lens 15 of the second camera 14 are disposed to face each other. The optical axes of the fish-eye lens 13 and the fish-eye lens 15 respectively are disposed on the same vertical line, and the side edge section 13a of the fish-eye lens 13 and a side edge section 15a of the fish-eye lens 15 are disposed on substantially a horizontal plane respectively.

A processor 30 (refer to FIG. 3) for generating image data of images captured by the first camera 12 and the second camera 14 respectively and for compressing this image data is incorporated in the pillar unit 11.

The processor 30 is connected with a power source 6 through a power source cable C1 and with a personal computer (to be hereinafter referred to as a "PC") 7 through a data cable C2. The PC 7 is connected with a monitor (a display unit) 8 structured by a CRT or a liquid crystal display unit, and is also connected with an input unit 9 such as a keyboard and a mouse.

The first camera 12 and the second camera 14 are electrically connected to the processor 30 respectively.

According to the monitoring system 10 shown in FIG. 1, the height from the floor surface to the side edge section 13a of the fish-eye lens 13 along a vertical direction is set at about 150 cm, and the height from the side edge section 15a of the fish-eye lens 15 to the ceiling along the vertical direction is set at about 90 cm. These heights are set to monitor whether a suspicious character exists or not around the cameras from a view point at the height of an eye line of a man. However, the heights of the fish-eye lenses 13 and 15 can be set suitably according to the usage and installation position of the monitoring system 10 and the conditions of the surrounding of the site of installation of the monitoring system.

Further, the distance between the side edge section 13a of the fish-eye lens 13 and the side edge section 15a of the fish-eye lens 15 is set at about 10 cm. For the fish-eye lenses 13 and 15 respectively, TS2VAE (with the diameter of about 4 cm) which is a product of Asahi Kogaku Kogyo Kabushiki Kaisha is used, as an example.

Figure 2:
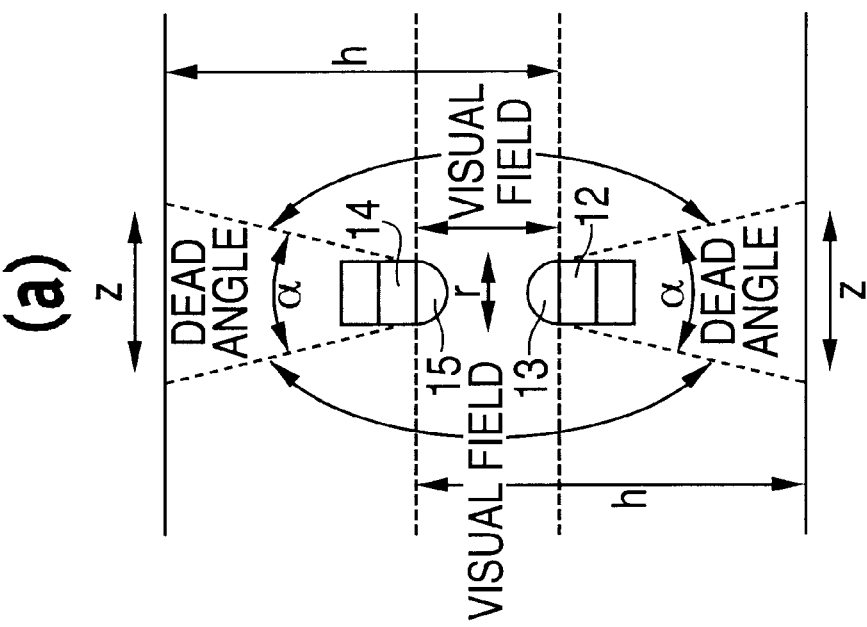
FIG. 2 shows a visual field range of a monitoring camera.

FIG. 2(a) and FIG. 2(b) show a visual field range (image pick-up range) of the fish-eye lens 13 and the fish-eye lens 15 respectively. As shown in FIG. 2(a) and FIG. 2(b), according to the monitoring system 10 of the present embodiment, predetermined ranges of the rear portion (lower portion) of the fish-eye lens 13 and the rear portion (upper portion) of the fish-eye lens 15 become blind spots. More specifically, these blind spots can be obtained by the following formulae (1) and (2).

Each dead angle α of the fish-eye lenses 13 and 15 respectively is obtained as follows:

$$\alpha = \arctan(r/L)[\text{degrees}] \qquad \text{(Formula 1)}$$

where, r represents the diameter of the fish-eye lens and L represents the center distance between the fish-eye lens 13 and the fish-eye lens 15. Further, a diameter z of the blind spot at a certain distance h on a optical axis from one of the centers of the fish-eye lens 13 and the fish-eye lens 15 is obtained as follows:

$$z = r \times h/L [cm] \qquad \text{(Formula 2)}$$

When the above Formulae (1) and (2) are applied to the example of the monitoring system 10 as shown in FIG. 1, each dead angle α of the fish-eye lenses 13 and 15 respectively is obtained as follows:

$$\alpha = \arctan(4/10) = 22[\text{degrees}]$$

Then, the diameter z of the blind spot of the floor surface of the room becomes:

$$z = 4 \times 160/10 = 64[cm]$$

and the diameter z of the blind spot of the ceiling of the room becomes:

$$z = 4 \times 100/10 = 40[cm]$$

As explained above, according to the monitoring system 10 of the present embodiment, all the ranges other than the above-described blind spots become visual field ranges of the fish-eye lenses 13 and 15, that is, image pick-up ranges by the first camera 12 and the second camera 14. Accordingly, it becomes possible to obtain a continuous image pick-up area without any gap between the image pick-up area of the first camera 12 and the image pick-up area of the second camera 14.

Further, the above-described blind spot exists locally at two positions. According to the example shown in FIG. 1, a circular blind spot of the diameter of about 64 cm is generated on the floor surface and a circular blind spot of the diameter of about 40 cm is generated on the ceiling. However, these blind spot areas are very small areas as compared with the visual field ranges. If it is so arranged that a man cannot reach these small areas, all the persons entering the floor are captured by the first camera 12 and the second camera 14.

In other words, when a person is entering the floor, the total image of the person is captured by the first camera 12 and the second camera 14 if there are no obstructions between the cameras and the person. Therefore, it is possible to extract easily the characteristics (including physical characteristics) of the person from a captured image data.

Further, according to the above-described structure, since a suspicious character cannot approach the first and second cameras 12 and 14 without passing through the image pick-up areas of the first camera 12 and the second camera 14, even if this person destroys the camera(s), the image of the physical characteristics of this person is captured by these cameras. Therefore, the captured image can be used as a reference for specifying the suspicious character after this trouble.

Although description has been made of the case in the present embodiment where the optical axis of each of the fish-eye lenses 13 and 15 is disposed along a vertical direction, the optical axis of each of the fish-eye lenses 13 and 15 may also be disposed along a horizontal direction or disposed in a slope according to the usage of the monitoring system 10. When the monitoring system is to be installed in a passage both sides of which are covered by walls, the cameras should be installed so that the optical axes of the fish-eye lenses 13 and 15 are set in a direction orthogonal with the passage direction and also along a horizontal direction. In such a case, only the small blind spots are formed on both walls.

Figure 3:
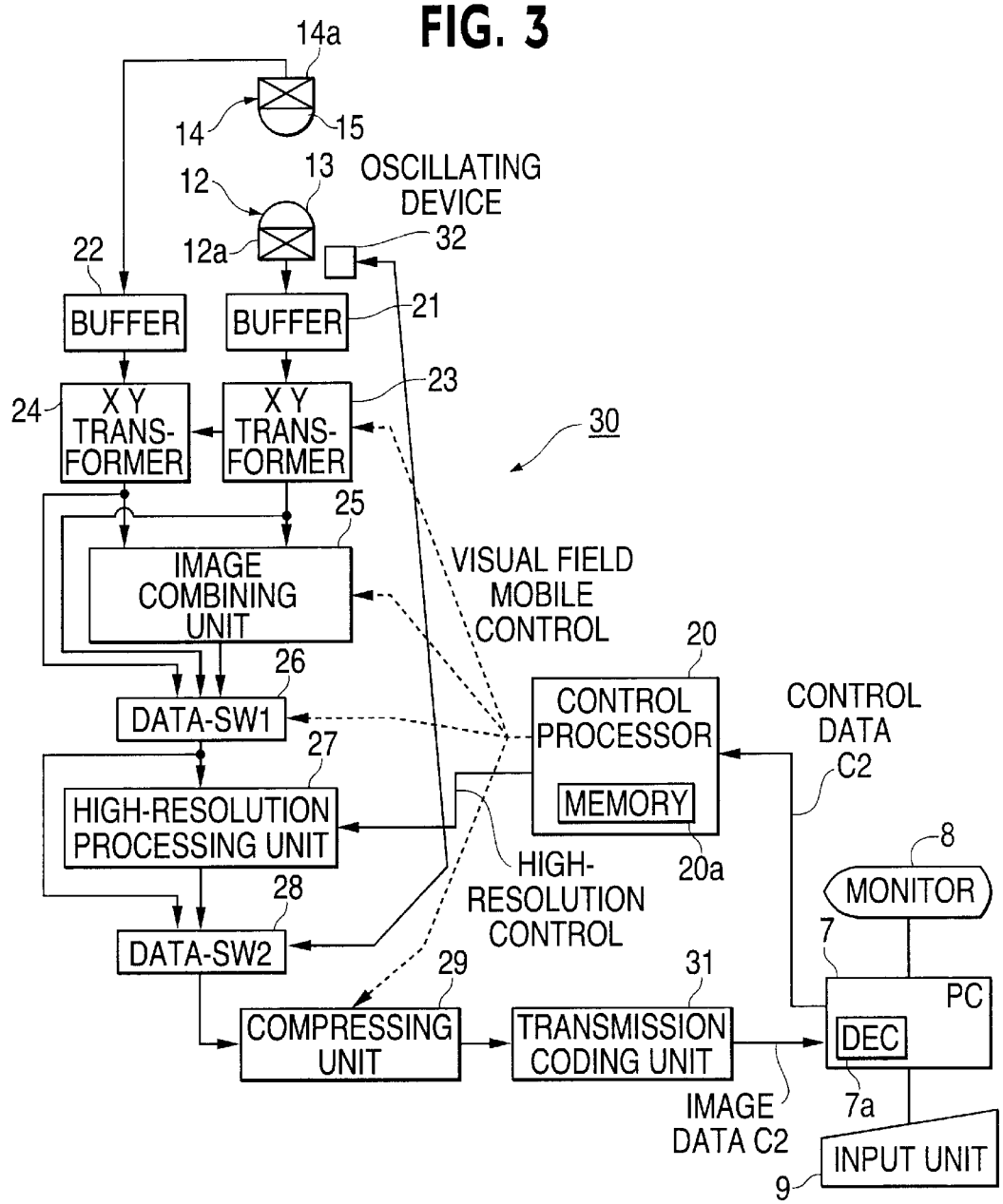
FIG. 3 shows an internal structure of the monitoring camera.

Next, the internal structure of the above-described monitoring system 10 will be explained based on FIG. 3. The processor 30 makes the monitor 8 display at about every one thirtieth second an image of the surroundings captured by the first camera 12 and the second camera 14.

The processor 30 includes a buffer 21 connected to the first camera 12, a buffer 22 connected to the second camera 14, an xy transformer 23 connected to the buffer 21, an xy transformer 24 connected to the buffer 22 and an image combining unit 25 connected to the xy transformers 23 and 24 respectively.

Further, the processor 30 includes a first data switch 26 connected to the xy transformer 23, the xy transformer 24 and the image combining unit 25 respectively, a high-resolution processing unit 27 connected to the first data switch 26, a second data switch 28 connected to the high-resolution processing unit 27 and the first data switch 26 respectively, a compressing unit 29 connected to the second data switch 28, and a transmission coding unit 31 connected to the compressing unit 29.

Further, the processor 30 includes an oscillating device 32 disposed near the first camera 12, and a control processor 20 for controlling the xy transformers 23 and 24, the image combining unit 25, the first data switch 26, the high-resolution processing unit 27, the second data switch 28 and the compressing unit 29 respectively. The transmission coding unit 31 is connected to the PC 7 through the data cable C2 shown in FIG. 1 and the control processor 20 is connected to the PC 7 through the data cable C2.

A camera circuit 12a having an image pick-up device (CCD) not shown is incorporated in the first camera 12. The camera circuit 12a picks up with the image pick-up device an image of the visual field range of the fish-eye lens 13 formed by the fish-eye lens 13, and outputs the image (picture) data to the buffer 21.

Similarly, a camera circuit 14a having an image pick-up device not shown is incorporated in the second camera 14. The camera circuit 14a picks up by the image pick-up device an image of the visual field range of the fish-eye lens 15 formed by the fish-eye lens 15, and outputs the image data to the buffer 22.

The buffers 21 and 22 temporarily store the image data given by the camera circuit 12a (the first image data) and the image data given by the camera circuit 14a (the second image data) respectively. Then, the buffers 21 and 22 supply the stored image data to the corresponding xy transformers 23 and 24 respectively. The image data stored in the buffers 21 and 22 are updated respectively at about every one thirtieth second.

The xy transformers 23 and 24 extract the image data of the monitoring range from the image data received from the buffers 21 and 22 respectively according to an instruction from the control processor 20 (which corresponds to the operation of the image data extracting unit). The image data extracted from each buffer is called frame data.

Then, the xy transformers 23 and 24 electronically transform the respective frame data. In other words, the xy transformers 23 and 24 eliminate distortions of the image due to the lens characteristics of the fish-eye lenses 13 and 15 respectively from the frame data, and transform the frame data into the first transformed frame data and the second transformed frame data (which corresponds to the operation of the transformer). The xy transformers 23 and 24 output the transformed frame data to the image combining unit 25 and to the first data switch 26 according to an instruction from the control processor 20.

Figure 4:
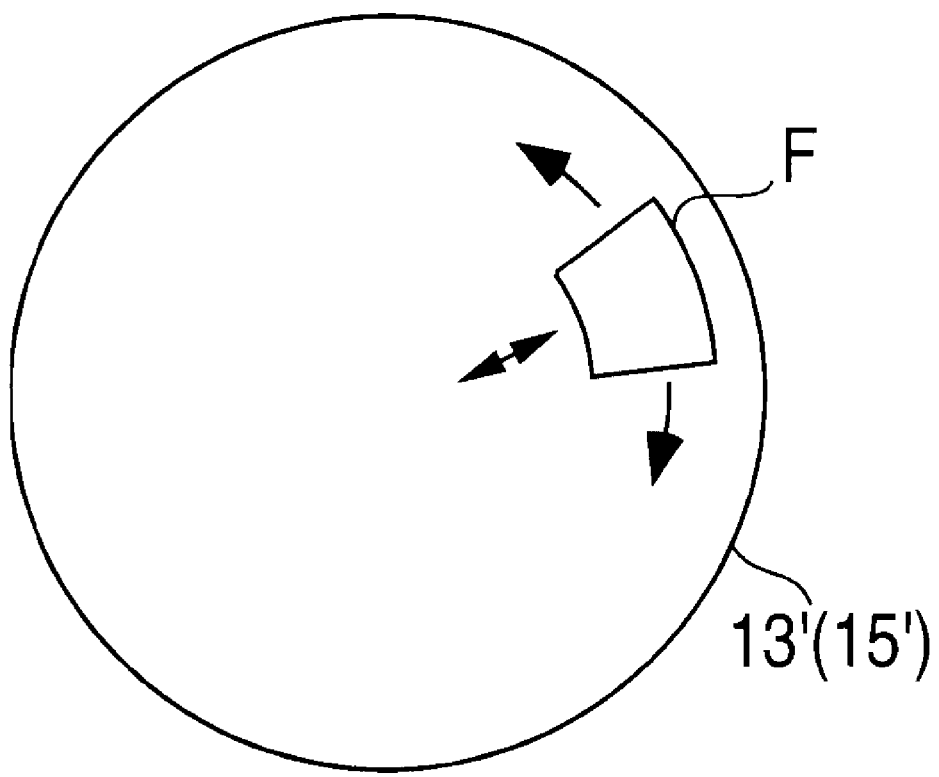
FIG. 4 shows a display area of a monitor.

FIG. 4 shows a relationship between an image pick-up range 13' (15') of the first camera 12 (the second camera 14) and a frame F (obtained range) of the frame data, and is a view observed from the front of the fish-eye lens 13 (the fish-eye lens 15). As shown in FIG. 4, according to the monitoring system 10 of the present embodiment, the frame F is set at a part of the image pick-up range 13' (15').

A position of the frame F within each image pick-up range 13' (15') is set according to the setting of the monitoring range. If the monitoring range includes both image pick-up ranges 13' and 15' of the first and second cameras 12 and 14, the frame F is set within both image pick-up ranges 13' and 15' respectively.

If the monitoring range is included in only one of the image pick-up range 13' of the first camera 12 and the image pick-up range 15' of the second camera 14, the frame F is set within only the image pick-up range which includes the monitoring range and the frame F is not set in the other image pick-up range.

The image combining unit 25 combines the first and second transformed frame data output from the xy transformers 23 and 24, according to an instruction from the control processor 20, and generates combined frame data (corresponding to the operation of the image combining unit).

During the operation of the monitoring system 10, a position data of the frame F is given to the xy transformers 23 and 24 from the control processor 20 at every one thirtieth second, as information on the monitoring range. Based on the position data of the frame F, the xy transformers 23 and 24 extract the frame data from the image data stored in the buffers 21 and 22 respectively. When the position data of the frame F output from the control processor 20 has been updated, the frame F moves along a peripheral direction or a radial direction of the image pick-up ranges 13' and 15' respectively.

Figure 5:
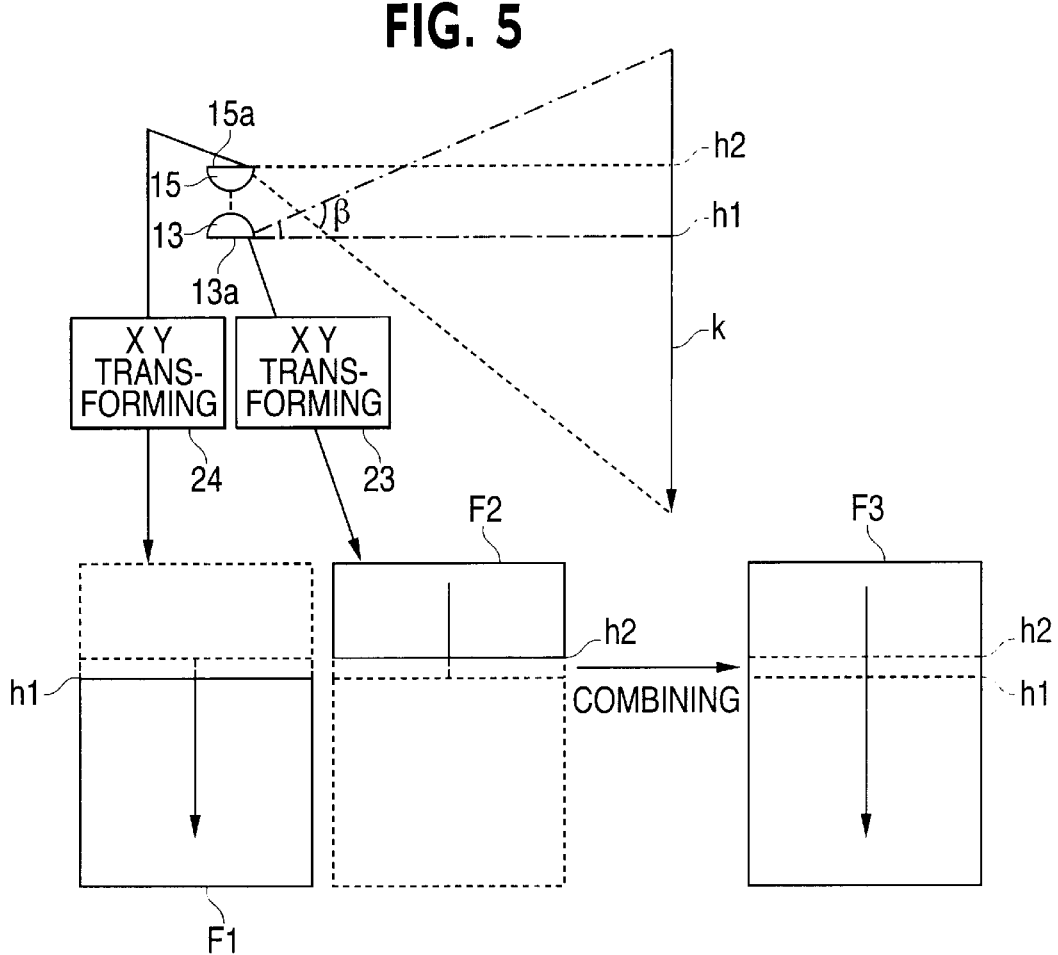
FIG. 5 shows a process by an image combining unit.

FIG. 5 is a principle diagram of a frame data combining process by the image combining unit 25. FIG. 5 shows an example of the frame data combining process for the case where a space between the monitoring system 10 and a wall K (a clipping surface) positioned at a predetermined distance from the monitoring system 10 is set as a monitoring range.

The xy transformers 23 and 24 extract a range included in the frame F from the image data obtained by the first camera 12 and the second camera 14 respectively, eliminate distortions of the images due to the characteristics of the fish-eye lens, and output transformed frame data F1 and F2 respectively. The image combining unit 25 combines the first and second transformed frame data F1 and F2 to generate combined frame data F3 for covering a monitoring range extending over the monitoring ranges of the first camera 12 and the second camera 14.

The image combining unit 25 at first extracts the image data of the range captured by only the first camera 12 from the first transformed frame data F1 in the monitoring range. In other words, the image combining unit 25 extracts the image data of the space below a horizontal plane h1 at which the side edge section 13a of the fish-eye lens 13 exists (the frame data of the first non-overlapped range, that is a portion shown by solid lines).

Next, the image combining unit 25 extracts the image data of the range captured by only the second camera 14 from the second transformed frame data F2 in the monitoring range. In other words, the image combining unit 25 extracts the image data of the space above a horizontal plane h2 at which the side edge section 15a of the fish-eye lens 15 exists (the frame data of the second non-overlapped range, that is a portion shown by solid lines).

Further, the image combining unit 25 extracts the image data of the overlapped portion of the first and second transformed frame data F1 and F2 (a range between the horizontal plane h1 and the horizontal plane h2) from the first and second transformed frame data F1 and F2 respectively, combines these data and generates the frame data of the combined range. Then, the image combining unit 25 combines the extracted frame data of the first and second non-overlapped range and the extracted frame data of the overlapped range, and generates the combined frame data F3 corresponding to the monitoring range.

The frame data of the overlapped range may be generated based on only one of the first and second transformed frame data F1 and F2.

The first data switch 26 is a selector for selecting any one of the frame data input from the xy transformer 23, the xy transformer 24 and the image combining unit 25 and outputting the selected frame data to the high-resolution processing unit 27 and the second data switch 28, according to an instruction from the control processor 20.

Based on an instruction from the control processor 20, the high-resolution processing unit 27 carries out a high-resolution processing to be described later for the frame data received from the image combining unit 25. Thereafter, the high-resolution processing unit 27 supplies the high-resolution processed frame data to the second data switch 28.

The second data switch 28 is a selector for selecting one of the frame data input from the first data switch 26 and the high-resolution processing unit 28 and outputting the selected frame data to the compressing unit 29, according to an instruction from the control processor 20.

The compressing unit 29 compresses the frame data received from the second data switch 28 by a compressing system based on MPEG (Moving Picture Experts Group) or based on the recommendation H. 261 of ITU-T (International Telecommunication Union-T), according to an instruction from the control processor 20 and outputs the compressed frame data to the transmission coding unit 31.

The transmission coding unit 31 codes the frame data received from the compressing unit 29 by the above-described coding system according to MPEG or the recommendation H. 261, and transmits the coded frame data to the PC 7 through the data cable C2.

The oscillating device 32 is structured by using an eccentric motor, for example, and oscillates the first camera 12 according to an instruction from the control processor 20 at the time of the high-resolution processing to be described later.

The PC 7 receives frame data from the transmission coding unit 31 through the data cable C2. Upon receiving the frame data, the PC 7 decodes the frame data by using a decoder (DEC) 7a incorporated in the PC 7 and makes the monitor 8 display an image based on the decoded frame data.

Instructions for the monitoring system 10 are input to the PC 7 from an operator through the input unit 9. Upon receiving the instructions from the input unit 9, the PC 7 transmits the instructions as the control data to the control processor 20 through the data cable C2.

The control processor 20 has a memory 20a structured by a ROM, RAM, etc. The memory 20a stores a program to be executed by the control processor 20 and various data to be used when the program is executed. Upon receiving the instructions from the PC 7, the control processor 20 executes the program stored in the memory 20a, to give commands to the xy transformers 23 and 24, the image combining unit 25, the first data switch 26, the high-resolution processing unit 27, the second data switch 28, the compressing unit 29 and the oscillating device 32, according to the instructions.

The operation of the monitoring system 10 will be explained below. After the power sources of the processor 30, the PC 7 and the monitor 20 have been turned on, the operator inputs instructions, for example, information for showing the monitoring range (an angle range β in FIG. 5) of the monitoring system 10 to the PC 7, and then the monitoring system 10 starts the operation.

In this case, description will be made of the case where the image combining unit 25 combines the frame data obtained by the first camera 12 and the frame data obtained by the second camera 14, to obtain the image data of the monitoring range.

Figure 6:
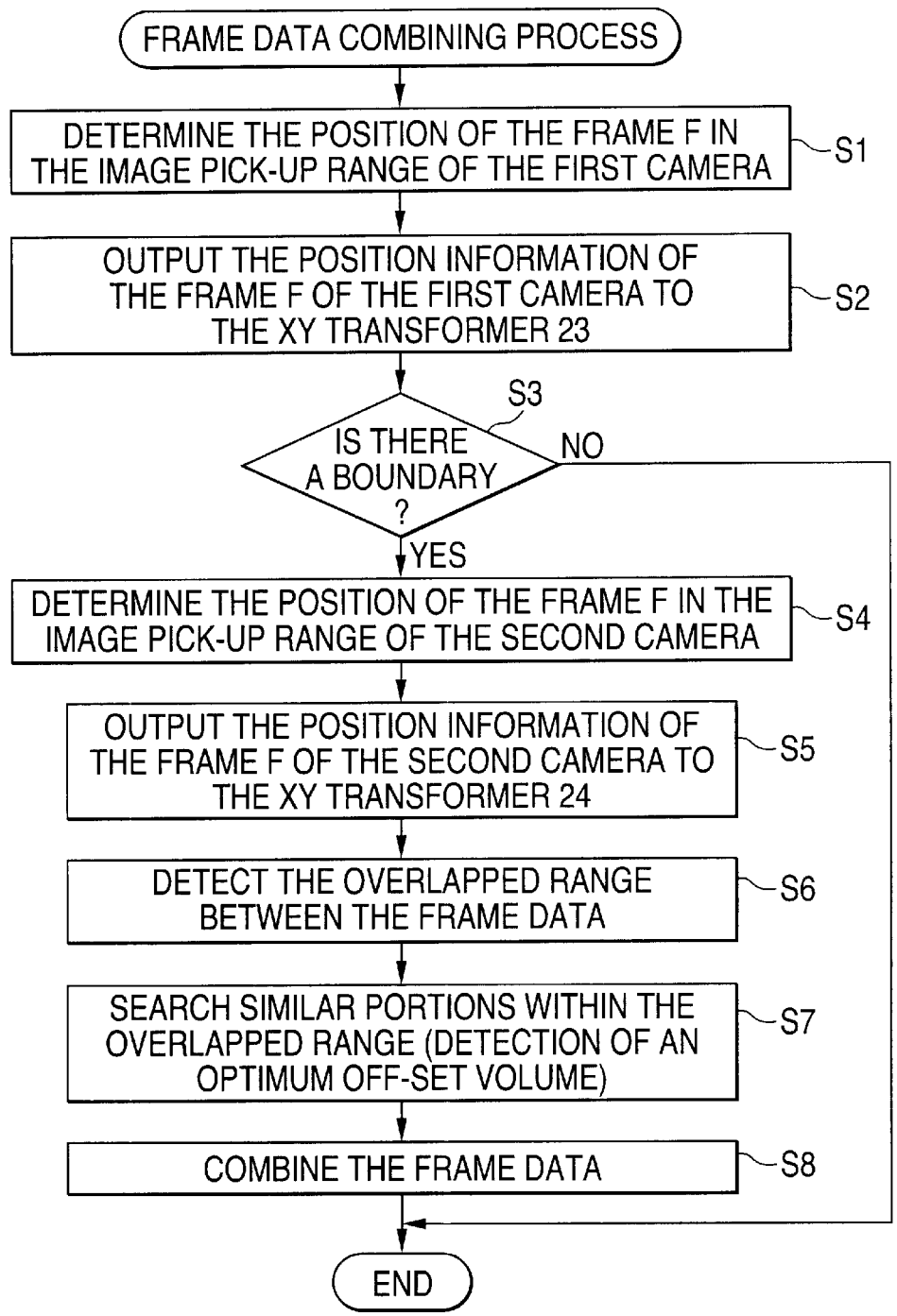
FIG. 6 is a flow chart for showing a process of combining frame data.

The monitoring range instruction input to the PC 7 is given to the control processor 20 through the data cable C2 as the commands. Then, the control processor 20 starts the frame data combining process. FIG. 6 is a flow chart for showing the frame data combining process.

Prior to the starting of this process, the first camera 12 and the second camera 14 obtain the image data in their respective image pick-up ranges. The respective image data obtained are stored in the corresponding buffers 21 and 22.

Referring to FIG. 6, the control processor 20 determines the position of the frame F in the image pick-up range 13' of the first camera 12 based on the monitoring range information (S1). The position of the frame F may be determined by reading the information stored in advance in the memory 20a corresponding to the memory range, or may be determined by a sequential calculation by the control processor 20 based on the monitoring range information.

Then, the control processor 20 outputs the position information of the frame F determined in S1 to the xy transformer 23 (S2). Based on the position information of the frame F, the xy transformer 23 extracts the portion included in the monitoring range from the image data stored in the buffer 21, and transforms this extracted portion and generates the first transformed frame data F1.

Next, the control processor 20 decides whether a boundary between the image captured by the first camera 12 and the image captured by the second camera 14 exists in the monitoring range (S3). In other words, the control processor 20 decides whether there is a range that cannot be captured by the first camera 12 (the range below the horizontal plane h1 in the example of FIG. 5) within the monitoring range input by the operator.

If there is no boundary within the monitoring range, the frame data combining process is over, and the first transformed frame data generated in S2 is output and the first data switch 26 selects this transformed frame data for outputting. If the boundary exists within the monitoring range, on the other hand, the control processor 20 determines the position of the frame F in the image pick-up range 15' of the second camera 14, based on the monitoring range information (S4).

Then, the control processor 20 outputs the position information of the frame F determined in S4 to the xy transformer 24 (S5). Based on the position information of the frame F, the xy transformer 24 extracts the portion included in the monitoring range from the image data stored in the buffer 22, and transforms this extracted portion and generates the second transformed frame data F2.

Then, the control processor 20 detects an angle difference between the first and second transformed frame data F1 and F2, to detect an overlapped range between the two frame data (S6).

The control processor 20 outputs the detected overlapped range data to the image combining unit 25. Based on the overlapped range data, the image combining unit 25 extracts non-overlapped range frame data captured by only the first camera 12 from the first transformed frame data F1 obtained from the xy transformer 23, and extracts non-overlapped range frame data captured by only the second camera 14 from the second transformed frame data F2 obtained from the xy transformer 24.

Then, the image combining unit 25 extracts a portion corresponding to the overlapped range from the first and second transformed frame data F1 and F2, based on the data of the overlapped range, and searches similar portions in both extracted data (S7). Then, the image combining unit 25 obtains a moving vector in a half pixel unit between the searched similar portions and carries out a data interpolation between the half pixels. Since the image of the overlapped range is captured near the side edge sections 13a and 15a of the fish-eye lenses 13 and 15 respectively, the magnification at the transforming is higher than that of the other portions, and therefore, the resolution is lowered in each frame data. Thus, it is desirable to form the overlapped range frame data by the above-described data interpolation to prevent the reduction of the resolution.

Then, the image combining unit 25 combines the first and second non-overlapped range frame data and the overlapped range frame data, to generate combined frame data (S8). Upon finishing this process in S8, the frame data combining process is over.

Thereafter, the first data switch 26 selects the combined frame data input from the image combining unit 25 and outputs this selected combined frame data to the high-resolution processing unit 27 and the second data switch 28, based on a change-over signal from the control processor 20.

The second data switch 28 transfers the combined frame data transferred from the first data switch 26 or the high-resolution combined frame data output from the high-resolution processing unit 27, to the compressing unit 29. The frame data input from the second data switch 28 is compressed by the compressing unit 29, coded by the transmission coding unit 31, and transferred to the PC 7 through the data cable C2.

The PC 7 decodes the transferred combined frame data, and makes the monitor 8 display an image based on this combined frame data. With this system, even in the case where the monitoring range extends over the image pick-up range of the first camera 12 and the image pick-up range of the second camera 14, it becomes possible to make the monitor 8 display the image of the monitoring range as one continuous image without any gap.

When a plurality of monitoring ranges are provided in the image pick-up range, the processor 30, the PC 7 and the monitor 8 are prepared by a plurality of number respectively and a plurality of frames F are also set in the image pick-up ranges of the first camera 12 and the second camera 14 respectively at the same time. Each of the images of the monitoring ranges is displayed simultaneously in each of the plurality of monitors 8.

Next, the high-resolution processing by the high-resolution processing unit 27 will be explained based on the flow chart shown in FIG. 7.

The monitoring system 10 of the present embodiment has a so-called electronic zooming function for making the monitor 8 display a specified area of the image pick-up range of the first camera 12 by magnifying this area at a desired magnification. However, since the electronic zooming is an artificial function for displaying an image of a narrow area on the CCD by enlarging this area at a predetermined display range, the resolution is lowered when the magnification is relatively high because the number of pixels of the CCD utilized for the display is decreased. To overcome this problem, according to the monitoring system 10 of the present embodiment, when an image is to be displayed in high magnification, the image is captured by oscillating the first camera 12 and a plurality of frame data are processed by the high-resolution processing unit 27 to generate a frame data, to thereby improve the resolution.

Figure 7:
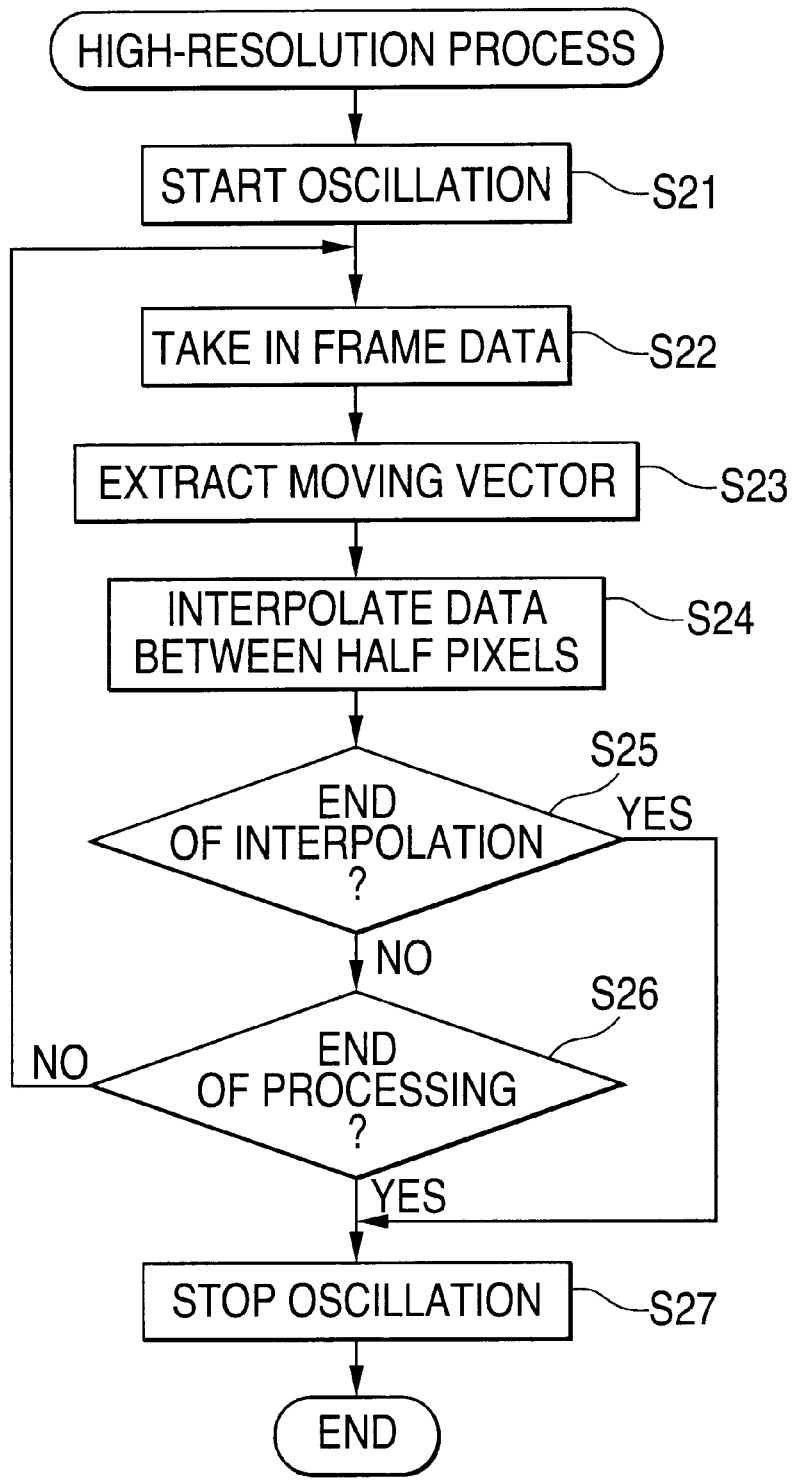
FIG. 7 is a flow chart for showing a high-resolution processing.

The high-resolution processing unit shown in FIG. 7 is started after instruction for displaying an object at high magnification is input to the PC 7 from the operator and then the commands are input to the control processor 20 as a high-resolution processing instruction.

At first, the control processor 20 gives a start instruction to the oscillating device 32 (S21). The image data captured in the oscillating state by the first camera 12 is stored in the buffer 21. The image data are extracted and transformed by the xy transformer 23 and output as the first frame data. The first data switch 26 selects the first frame data output from the xy transformer 23, and the first frame data are taken in by the high-resolution processing unit 27 (S22). The high-resolution processing unit 27 takes in a plurality of the first frame data and detects changes in the frame data.

In other words, the high-resolution processing unit 27 extracts a moving vector (a vector of an object moved by the oscillation) from the plurality of first frame data according to the high-resolution processing instruction from the control processor 20 (S23). Then, the high-resolution processing unit 27 carries out a data interpolation between the half pixels based on the extracted moving vector (S24).

Thereafter, the high-resolution processing unit 27 decides whether the interpolation process of the first frame data has finished (S25), and if the interpolation process has finished, the high-resolution process is over. If the interpolation process has not finished yet, on the other hand, the process goes to S26.

At S26, the high-resolution processing unit 27 decides whether the high-resolution process should be finished, or decides whether a high magnification display by the electronic zooming function has been returned to the normal display. If the process is not finished, the process from S22 is repeated. For finishing the process, S27 is finished after the oscillator has been stopped.

The high-resolution combined frame data after the high-resolution process are transferred to the PC 7 through the second data switch 28 and the compressing unit 29, and are displayed in the monitor 8.

Figure 8:
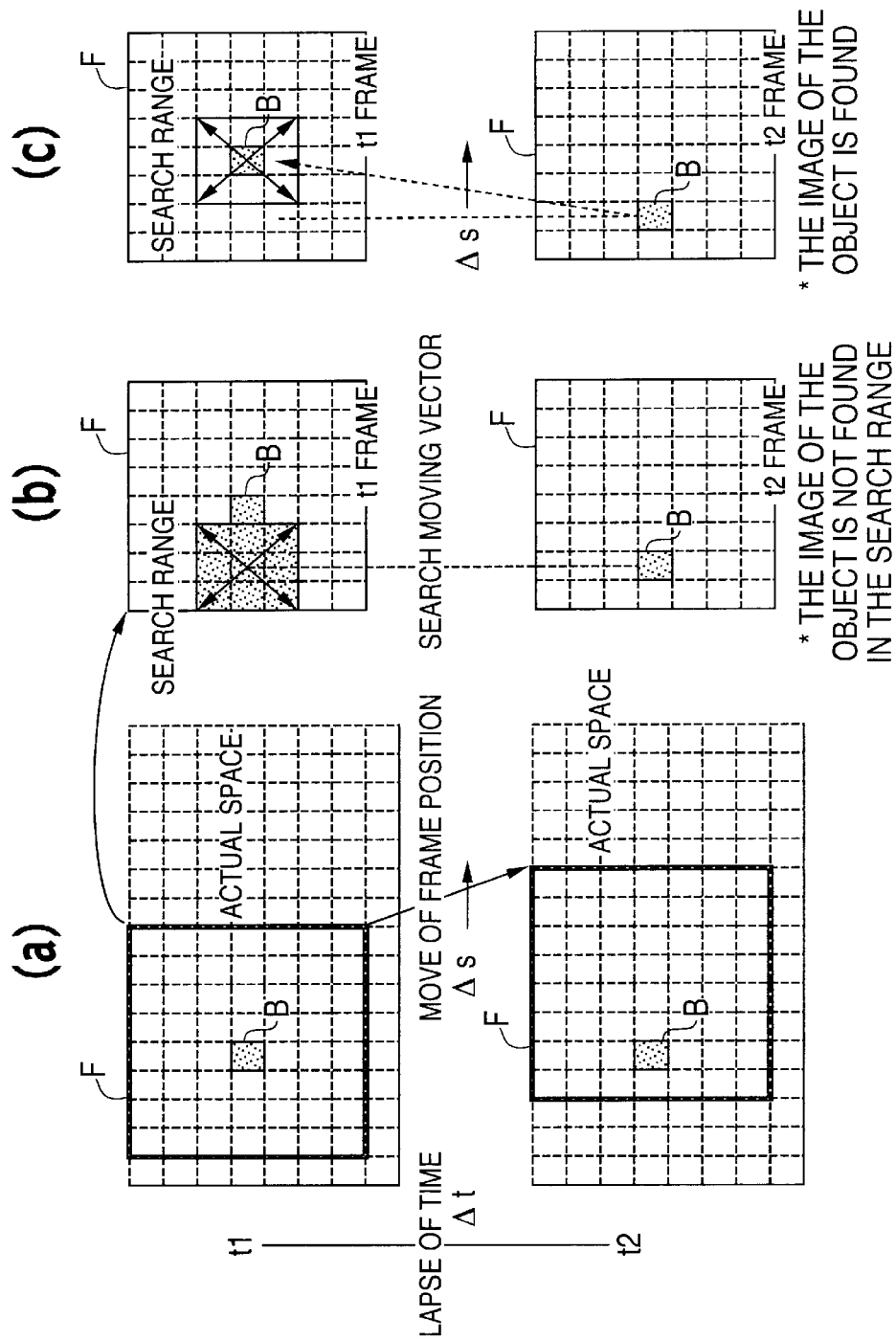
FIG. 8 shows a process by a compressing unit.
Figure 10:
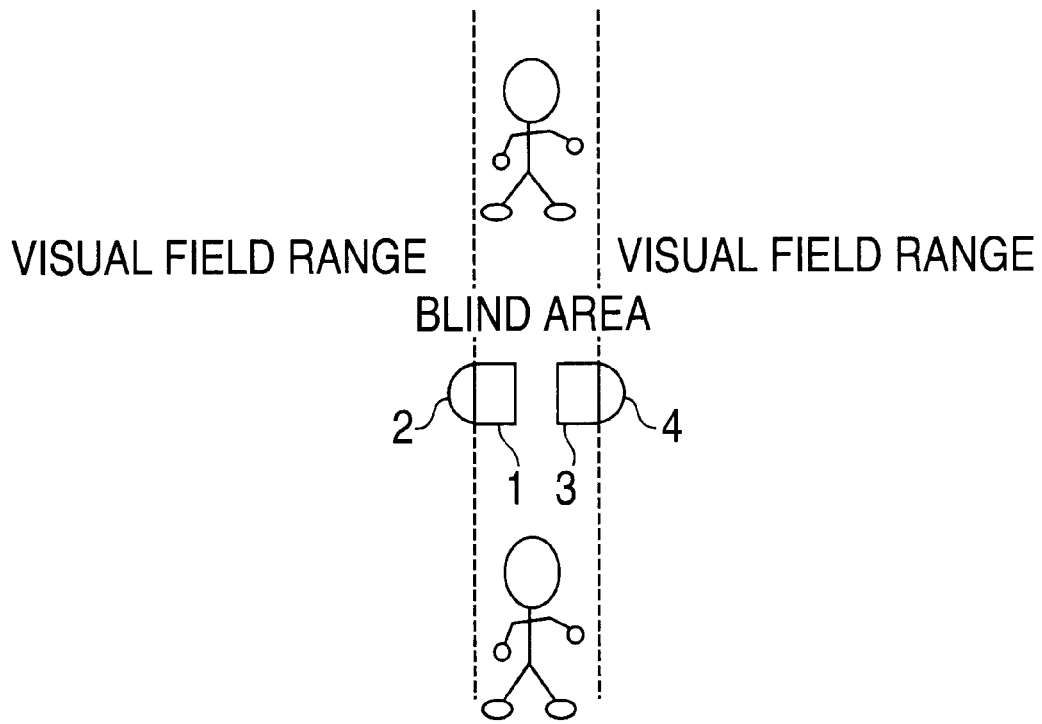
Figure 11:
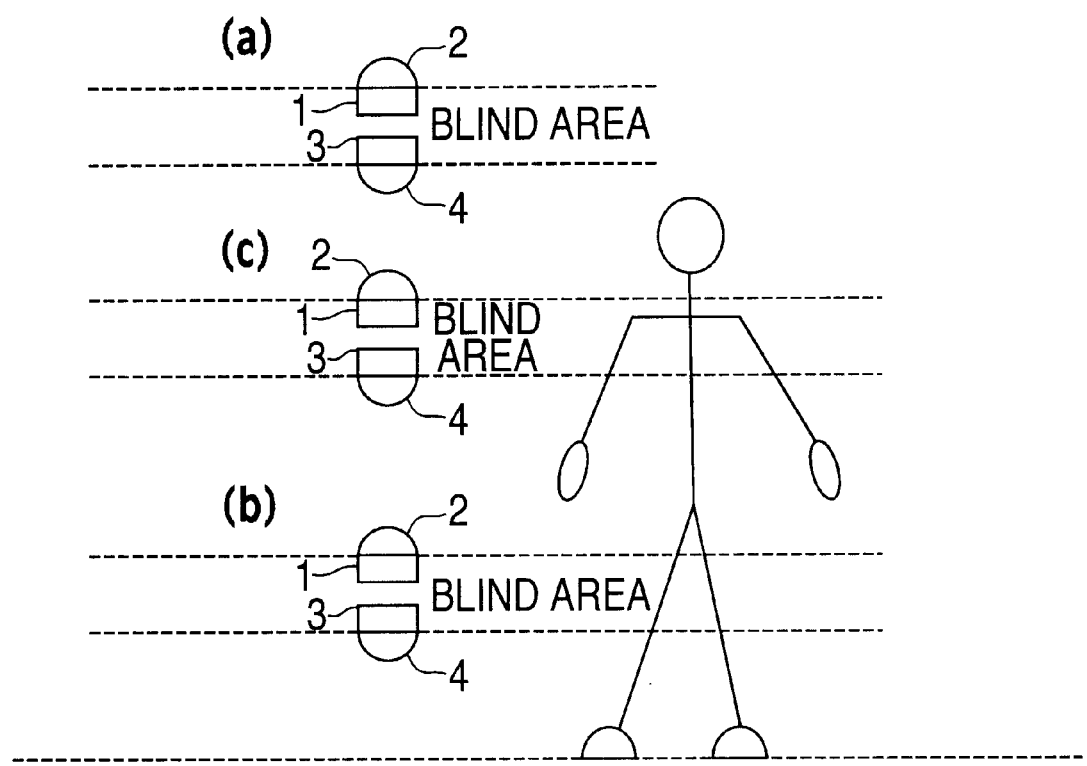

Next, the process by the compressing unit 29 will be explained based on FIG. 8. According to the compressing system of moving picture data based on MPEG or the recommendation H. 261, an object that has moved between continuous frames is searched, a moving vector of this object is generated, and this vector information is coded (moving vector compensation). This method is based on the assumption that there is no change in the image pick-up range between the continuous frames.

However, if the monitoring range of the monitoring system 10 is moved continuously, there is a case where it is not possible to search an object which has actually moved within the monitoring range because the total monitoring range changes between the continuous frames, and thus it is not possible to generate the moving vector of the corresponding object.

For example, as shown in FIG. 8(a), if a frame F at a certain time t1 (a preceding frame) moves to the right side of the paper by Δs at time t2 after a lapse of time of Δt, an object (a still object) B within the frame F at the time t1 moves to the left side on the paper by Δs within the frame F (a current frame) at the time t2.

Thereafter, the object B in the preceding frame is searched for from the position of the object B in the current frame, and the moving vector of the object B is generated. In general, the object B in the preceding frame is searched for in a predetermined range around the position of the object B in the current frame in the light of the high-speed processing.

However, if the position of the object B in the preceding frame is not located within the searching range, as shown in FIG. 8(b), it is not possible to generate the moving vector of the object B. In this case, the image data of the current frame is coded as it is and is transferred to the PC 7. This results in a reduction in the compression rate and a reduction in the frame rate, and further there is a risk of increasing the processing load of the PC 7.

To overcome the above problems, the compressing unit 29 according to the present embodiment carries out the following process for the searching for the object B. According to the present embodiment, position information of the frame F is included in the instruction to be given from the control processor 20 to the compressing unit 29. By receiving the position information of the frame F, the compressing unit 29 calculates the moving vector of the frame between the preceding frame and the current frame. In searching for the object B from the preceding frame, the compressing unit 29 moves the center position of the searching range according to the calculated moving vector of the frame, and searches for the object B in the searching range after the moving.

In other words, as shown in FIG. 8(c), in order to search for the object B from the preceding frame, the moving vector Δs between the preceding frame and the current frame is calculated, and the center position of the searching range is moved by Δs. With this process, the object B can be easily searched for from the preceding frame.

Thereafter, the compressing unit 29 generates a moving vector of the object B. As explained above, the compressing unit 29 of the present embodiment can properly search for the object B and generate its moving vector even if the frame F moves along with a lapse of time. Accordingly, it is possible to prevent a reduction in the compression rate and the frame rate and to prevent an increase in the processing load of the PC 7.

What is claimed is:

1. A monitoring system, comprising:
   a first camera having a fish-eye lens;
   a second camera having a fish-eye lens, said first and second cameras being disposed in opposite directions and aligned with the lens of said first camera and the lens of said second camera facing one another, each fish-eye lens of the first camera and the second camera having a dead angle of approximately 22 degrees;
   image data extracting means for extracting first and second frame data corresponding to a monitoring range from first image data captured by said first camera and second image data captured by said second camera; and
   image combining means for generating combined frame data corresponding to the monitoring range by combining the first and second frame data extracted by said image data extracting means,
   wherein said first and second cameras are arranged sufficiently close together without creating parallax and without an object to be photographed being located between said first and second cameras, and said image combining means generates the combined frame data having a seamless connection between the first image data and the second image data.

2. A monitoring system according to claim 1, further comprising display means for displaying an image within the monitoring range based on combined frame data output from said image combining means.

3. A monitoring system according to claim 1, wherein said first and second cameras are disposed so that optical axes of the fish-eye lenses of said cameras are substantially parallel with a vertical direction.

4. A monitoring system according to claim 1, wherein said first and second cameras are disposed so that optical axes of the fish-eye lenses of said cameras substantially match together.

5. A monitoring system according to claim 1, further comprising means for transforming the first and second frame data extracted by said image data extracting means, before combining the frame data by said image combining means.

6. A monitoring system according to claim 5, wherein said transforming means eliminates distortions of an image due to characteristics of the fish-eye lenses of said first camera and said second camera.

7. A monitoring system according to claim 2, further comprising image compressing means for compressing the combined frame data output from said image combining means and for sending the compressed frame data to said display means.

8. A monitoring system according to claim 5, wherein said image combining means extracts frame data of a non-overlapped range captured by only said first camera from the first transformed frame data, extracts frame data of a non-overlapped range captured by only said second camera from the second transformed frame data, extracts frame data of an overlapped range from at least one of the first and second transformed frame data, and combines the frame data of the two non-overlapped ranges and the frame data of the overlapped range to generate the combined frame data.

9. A monitoring system according to claim 8, wherein said image combining means extracts frame data of an overlapped range from both the first and second transformed frame data to improves the resolution of the frame data of the overlapped range by interpolating the overlapped frame data.

10. A monitoring method, comprising:
    picking up an image by a first camera having a fish-eye lens and an image by a second camera having a fish-eye lens, the first and second cameras being disposed in opposite directions and aligned with the lens of the first camera and the lens of the second camera facing one another, each fish-eye lens of the first camera and the second camera having a dead angle of approximately 22 degrees;
    extracting image data of a range corresponding to a monitoring range from first image data captured by the first camera and second image data captured by the second camera, respectively;
    transforming the extracted first image data and the extracted second image data into first transformed frame data and second transformed frame data, respectively;
    generating combined image data by combining the first transformed frame data and the second transformed frame data; and
    displaying in a display unit an image based on the combined image data,
    wherein the first and second cameras are arranged sufficiently close together without creating parallax and without an object to be photographed being located between the first and second cameras, and the combined image data have a seamless connection between the first image data and the second image data.

11. A monitoring method according to claim 10, further comprising compressing the combined image data and sending the compressed data to the display unit.

12. A monitoring method according to claim 10, wherein said generating combined image data comprises extracting the frame data of a non-overlapped range obtained by only the first camera, the frame data of a non-overlapped range obtained by only the second camera, and the frame data of an overlapped range obtained in superposition by the first camera and the second camera, respectively, from the first transformed frame data and the second transformed frame data, and combining the frame data to generate the combined image data.

13. A monitoring system, comprising:
    a first camera having a first fish-eye lens; and
    a second camera having a second fish-eye lens, said first and second cameras being disposed with the first and second fish-eye lenses facing one another and an optical axis of the first fish-eye lens and an optical axis of the second fish-eye lens substantially aligning, each fish-eye lens of the first camera and the second camera having a dead angle of approximately 22 degrees,
    wherein said first and second cameras are arranged sufficiently close together without creating parallax and without an object to be photographed being located between said first and second cameras, and combined image data are generated having a seamless connection between first image data photographed by said first camera and second image data photographed by said second camera.

14. A monitoring method, comprising:

arranging a first camera having a first fish-eye lens and a second camera having a second fish-eye lens with the first and second lenses facing one another and an optical axis of the first fish-eye lens and an optical axis of the second fish-eye lens substantially aligning, each fish-eye lens of the first camera and the second camera having a dead angle of approximately 22 degrees, wherein the first and second cameras are arranged sufficiently close together without creating parallax and without an object to be photographed being located between the first and second cameras, and combined image data having a seamless connection between first image data photographed by the first camera and second image data photographed by the second camera.

* * * * *